(12) United States Patent
Cinquemani et al.

(10) Patent No.: US 10,392,483 B2
(45) Date of Patent: Aug. 27, 2019

(54) SEMIFINISHED PRODUCT FOR MAKING MOLDED COMPOSITE PART AND METHOD OF MAKING SAME

(71) Applicant: Reifenhaeuser GmbH & Co. Maschinenfabrik, Troisdorf (DE)

(72) Inventors: Claudio Cinquemani, Cologne (DE); Michael Nitschke, Bonn (DE); Nicolas Quick, Winterberg (DE); Armin Tobay, Euskirchen (DE)

(73) Assignee: REIFENHAEUSER GMBH & CO. KG MASCHINENFABRIK, Troisdorf (DE)

( * ) Notice: Subject to any disclaimer, the term of this patent is extended or adjusted under 35 U.S.C. 154(b) by 704 days.

(21) Appl. No.: 14/428,004

(22) PCT Filed: Oct. 2, 2013

(86) PCT No.: PCT/EP2013/070579
§ 371 (c)(1),
(2) Date: Mar. 13, 2015

(87) PCT Pub. No.: WO2014/053566
PCT Pub. Date: Apr. 10, 2014

(65) Prior Publication Data
US 2015/0225518 A1    Aug. 13, 2015

(51) Int. Cl.
*C08J 5/04* (2006.01)
*B29C 70/46* (2006.01)
(Continued)

(52) U.S. Cl.
CPC .............. *C08J 5/043* (2013.01); *B29B 11/16* (2013.01); *B29B 15/105* (2013.01);
(Continued)

(58) Field of Classification Search
CPC ..... C08J 5/043; C08J 2323/12; B29C 70/465; B29C 51/004; B29C 70/504; B29C 70/50;
(Continued)

(56) References Cited

U.S. PATENT DOCUMENTS 4,041,203 A * 8/1977 Brock .................. B32B 5/08
156/291
4,910,064 A * 3/1990 Sabee .................. D04H 3/04
156/62.4
(Continued)

FOREIGN PATENT DOCUMENTS

EP          0420772 A      4/1991
EP          0420772 A1 *   4/1991   ........... B29B 15/105
WO      1992002357 A      2/1992

OTHER PUBLICATIONS

"EP0420772_Machine Translation" is a machine translation of EP 0420772.*

(Continued)

*Primary Examiner* — Jeffrey M Wollschlager
(74) *Attorney, Agent, or Firm* — Andrew Wilford

(57) ABSTRACT

The invention relates to a method for producing a semi-finished product for producing a composite molded part (7), in particular a composite fiber molded part, wherein a higher-melting reinforcement material (8), in particular higher-melting reinforcement fibers are combined with lower-melting fibers (10) made of thermoplastic into a laminate (4), wherein the lower-melting fibers are spun and after spinning are combined at a fiber temperature $T_F$ with the higher-melting reinforcement material, in particular with higher-melting reinforcement fibers, into the laminate forming the semi-finished product. The fiber temperature $T_F$ lies in a temperature range between a temperature of 25° C.

(Continued)

below the heat distortion temperature $T_W$ to 55° C. above the heat distortion temperature $T_W$ of the thermoplastic of the lower-melting fibers.

14 Claims, 4 Drawing Sheets

(51) Int. Cl.
| | |
|---|---|
| *B29B 11/16* | (2006.01) |
| *B29B 15/10* | (2006.01) |
| *B29K 21/00* | (2006.01) |
| *B29C 70/50* | (2006.01) |
| *B29C 51/00* | (2006.01) |
| *B29C 70/34* | (2006.01) |
| *B29C 70/02* | (2006.01) |
| *B29C 70/04* | (2006.01) |
| *B29C 70/06* | (2006.01) |
| *B29C 70/08* | (2006.01) |
| *B29C 70/40* | (2006.01) |
| *B32B 5/06* | (2006.01) |
| *B29C 70/18* | (2006.01) |
| *B29C 70/16* | (2006.01) |
| *B32B 5/26* | (2006.01) |
| *B29K 101/12* | (2006.01) |

(52) U.S. Cl.
CPC .......... *B29C 70/465* (2013.01); *B29C 51/004* (2013.01); *B29C 70/021* (2013.01); *B29C 70/04* (2013.01); *B29C 70/06* (2013.01); *B29C 70/08* (2013.01); *B29C 70/083* (2013.01); *B29C 70/085* (2013.01); *B29C 70/16* (2013.01); *B29C 70/18* (2013.01); *B29C 70/34* (2013.01); *B29C 70/342* (2013.01); *B29C 70/345* (2013.01); *B29C 70/347* (2013.01); *B29C 70/40* (2013.01); *B29C 70/50* (2013.01); *B29C 70/504* (2013.01); *B29K 2021/003* (2013.01); *B29K 2101/12* (2013.01); *B32B 5/06* (2013.01); *B32B 5/26* (2013.01); *C08J 2323/12* (2013.01)

(58) Field of Classification Search
CPC ..... B29C 70/34; B29C 70/342; B29C 70/345; B29C 70/347; B29C 70/021; B29C 70/04; B29C 70/06; B29C 70/08; B29C 70/083; B29C 70/085; B29C 70/16; B29C 70/18; B29C 70/40–508; B29B 15/105; B29B 11/16; B29K 2101/12; B29K 2021/003; B32B 5/06; B32B 5/26
See application file for complete search history.

(56) References Cited

U.S. PATENT DOCUMENTS

| | | | | |
|---|---|---|---|---|
| 5,093,158 | A | * | 3/1992 | Li .................. B29B 15/122 427/264 |
| 5,219,633 | A | * | 6/1993 | Sabee .................. D04H 5/06 156/167 |
| 5,468,440 | A | * | 11/1995 | McAlpin ............... B29C 55/005 156/229 |
| 5,476,616 | A | * | 12/1995 | Schwarz ............. B29C 47/0014 156/167 |
| 5,492,580 | A | * | 2/1996 | Frank .................. B29C 43/006 156/148 |
| 5,683,794 | A | * | 11/1997 | Wadsworth ............... B32B 5/26 442/381 |
| 5,726,103 | A | * | 3/1998 | Stahl ................. B32B 5/26 428/221 |
| 6,013,223 | A | * | 1/2000 | Schwarz ............. D01D 5/0985 264/103 |
| 6,187,699 | B1 | * | 2/2001 | Terakawa .......... A61F 13/51401 442/361 |
| 6,203,646 | B1 | * | 3/2001 | Gundberg ............ D04H 1/4209 156/167 |
| 6,407,018 | B1 | * | 6/2002 | Zafiroglu .................. B32B 5/26 428/102 |
| 6,905,563 | B2 | * | 6/2005 | Dong .................... E04B 1/7662 156/167 |
| 7,132,025 | B2 | | 11/2006 | Dittmar |
| 7,441,667 | B2 | * | 10/2008 | Galvin .................. B01D 69/10 210/500.1 |
| 8,142,584 | B2 | * | 3/2012 | Yang ................. B32B 5/26 156/62.2 |
| 9,199,416 | B2 | * | 12/2015 | Ayyildiz ............... B29B 15/122 |
| 2003/0129908 | A1 | * | 7/2003 | Wadsworth ............... B32B 5/26 442/382 |
| 2010/0086727 | A1 | * | 4/2010 | Katayama ............... B29C 43/02 428/102 |
| 2010/0186880 | A1 | * | 7/2010 | Nair .................. B29C 70/46 156/166 |
| 2010/0266824 | A1 | * | 10/2010 | Westwood ............... B32B 5/26 428/212 |
| 2012/0123374 | A1 | * | 5/2012 | Richeson ................. C08F 8/50 604/372 |

OTHER PUBLICATIONS

Heat Deflection Temperature (HDT) at 0.46 MPa; SpecialChem; 2017; pp. 1-3.*

Russell, S.J., Handbook of Nonwovens, Woodhead Publishing, Cambridge England, 2007.

* cited by examiner

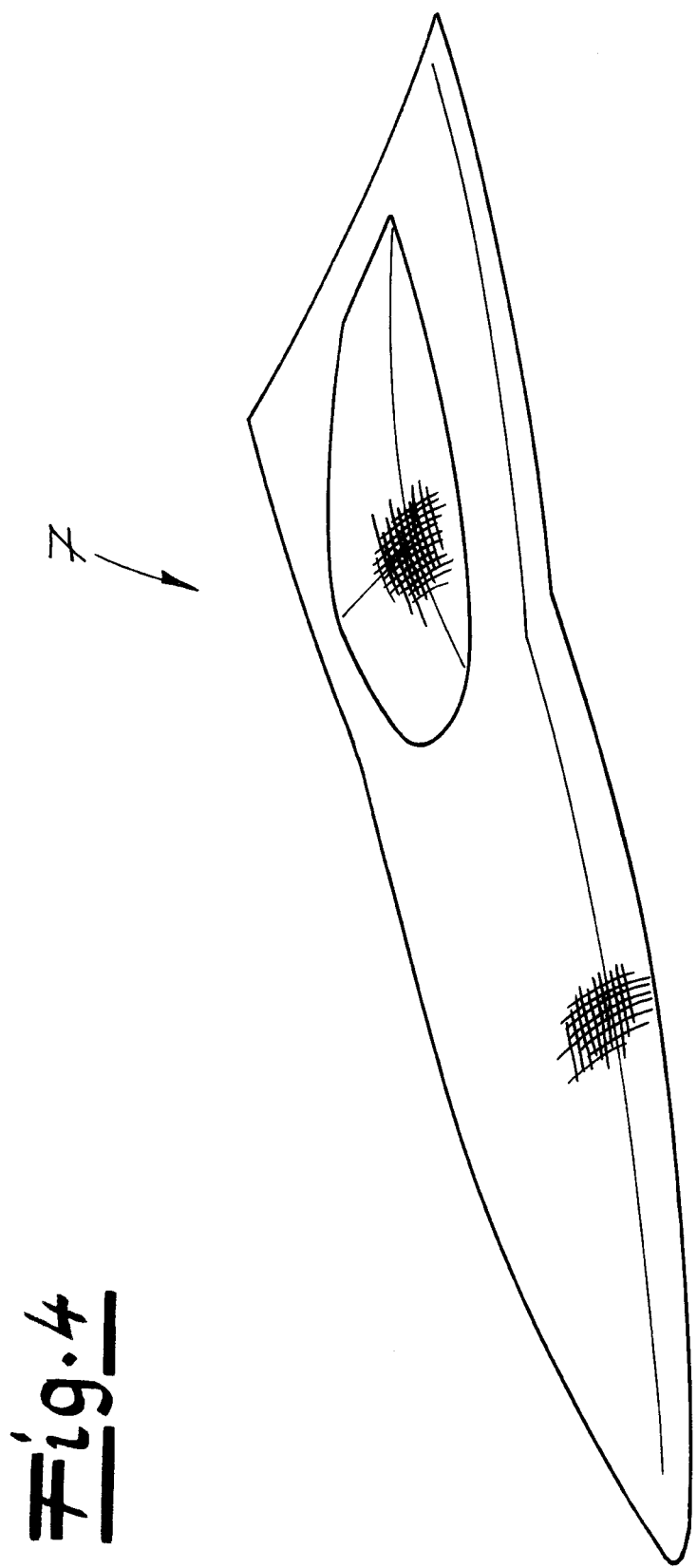

SEMIFINISHED PRODUCT FOR MAKING MOLDED COMPOSITE PART AND METHOD OF MAKING SAME

CROSS REFERENCE TO RELATED APPLICATIONS

This application is the US-national stage of PCT application PCT/EP2013/070579 filed 2 Oct. 2013 and claiming the priority of European patent application 12186973.9 itself filed 2 Oct. 2012.

FIELD OF THE INVENTION

The invention relates to a method of making a semifinished product for making a composite molded part, in particular a composite fiber molded part. The invention further relates to a semifinished product for making such a composite molded part, in particular a composite fiber molded part.

Furthermore the invention also relates to a composite molded part, in particular a composite fiber molded part. The invention relates especially to composite molded parts or composite fiber molded parts as a lightweight construction.

BACKGROUND OF THE INVENTION

The term "composite molded part" means that reinforcement material or non-molten reinforcement material is embedded in a matrix of thermoplastic plastic. The term "composite fiber molded part" means that fibers or non-molten fibers are present in the composite molded part or in the matrix of thermoplastic plastic. The composite molded parts or composite fiber molded parts produced according to the invention can on the one hand have a two-dimensional form, in particular the shape of a plate or the like. The composite molded parts or composite fiber molded parts produced according to the invention preferably have a three-dimensional shape.

Methods, semifinished products and composite molded parts of the type referred to above are already known in the art in different embodiments. In the known methods, first of all semifinished products are produced that consist of a matrix of thermoplastic plastic and reinforcement fibers embedded therein. To this end the reinforcement fibers—for example glass fibers—are first of all combined with films, powders, fibers or melts of thermoplastic plastic. The thermoplastic plastic is melted by the application of heat and pressure and in this way the reinforcement fibers are impregnated with the melt, ultimately resulting in the semifinished product made of the thermoplastic matrix with the embedded reinforcement fibers. These semifinished products are also known as organic sheets and they are generally produced in the form of plates. For making a composite fiber molded part with a three-dimensional shape the plates must be heated again in a later additional processing step before they can be formed into the required composite fiber molded part. The known methods and semifinished products have a number of disadvantages. First of all in the manufacture of semifinished products—in particular when films of thermoplastic plastic are used—the extent of the penetration or impregnation of the reinforcement fibers with the thermoplastic plastic leaves something to be desired. Furthermore air inclusions are frequently produced and as a result weak points are created in the composite molded part or composite fiber molded part that is produced. Moreover, the semifinished products that are produced are often characterized by insufficient draping properties. Therefore the manufacture of three-dimensional or multi-dimensional composite molded parts or composite fiber molded parts is subject to limitations. Furthermore the recycling of known fiber composite materials is difficult when a thermoplastic matrix is reinforced with reinforcement fibers that are inorganic or difficult to melt. Moreover the recycling of thermosetting plastics is also difficult and costly in the case of composite molded parts or composite fiber molded parts produced according to the known measures.

OBJECT OF THE INVENTION

On the other hand the object of the invention is to provide a method of the type referred to above, where the previously described disadvantages can be avoided in an effective and functionally reliable manner. Furthermore another object of the invention is to provide a semifinished product for the manufacture of a composite molded part or composite fiber molded part as well as a corresponding composite molded part or composite fiber molded part.

SUMMARY OF THE INVENTION

In order to attain these objects, the invention proposes a method of making a semifinished product for the manufacture of a composite molded part, in particular a composite fiber molded part, wherein a high-melting reinforcement material, in particular high-melting reinforcement fiber is combined with low-melting fibers made of thermoplastic plastic into a laminate, wherein the low-melting fibers are spun and are combined at a fiber temperature $T_F$ with the high-melting reinforcement material, in particular with the high-melting reinforcement fibers into the laminate forming the semifinished product, wherein the fiber temperature $T_F$ lies in a temperature range between a temperature of 25° C. below the heat distortion\ temperature $T_W$ to 55° C. above the heat-distortion temperature $T_W$ of the thermoplastic plastic of the low-melting fibers. Thus the following applies: $T_W-25°$ C.$\leq T_F \leq T_W+55°$ C. It is within the scope of the invention that the fiber temperature $T_F$, is lower than the melting temperature of the thermoplastic plastic of the low-melting fibers. It is also within the scope of the invention that the low-melting fibers are spun and after the spinning are combined at a fiber thickness<10 den, preferably <3 den and particularly preferably <1.5 den and at the fiber temperature $T_F$, with the high-melting reinforcement material, in particular with the high-melting reinforcement fibers, into the laminate forming the semifinished product.

Within the scope of the invention "high-melting" means that the high-melting component has a higher melting point than the low-melting component, the two melting points being determined under the same external conditions. Within the scope of the invention high-melting reinforcement material also encompasses non-melting reinforcement material and accordingly within the scope of the invention the term "high-melting reinforcement fibers" also encompasses non-melting reinforcement fibers. These reinforcement fibers—for example carbon fibers—generally disintegrate at very high temperatures. It is recommended that the reinforcement material and in particular the reinforcement fibers are used as laid fabric and/or woven fabric and/or braided fabric and/or knitted fabric and/or meshes or the like. A preferred embodiment is characterized in that at least one laid fabric and/or at least one woven fabric made of reinforcement fibers forms/form the at least one layer of high-melting reinforcement fibers. Within the scope of the invention high-melting foams or honeycombs can be used as high-melting reinforcement material. It is within the scope of the invention that the melting point of the high-melting reinforcement material or the high-melting reinforcement fibers is at least 1° C., preferably at least 5° C. higher than the melting point of the low-melting fibers. According to an embodiment of the invention the melting point of the high-melting reinforcement material or the high-melting reinforcement fibers is at least 20°, preferably at least 30° C. and preferably at least 50° C. higher than the melting point of the low-melting fibers.

According to the invention the fiber temperature $T_F$, of the low-melting fibers in their combination with the reinforcement material or with the reinforcement fibers in the range specified there is lower than the heat-distortion temperature $T_W$ or in the range specified there is higher than the heat-distortion temperature $T_W$ of the thermoplastic plastic of the low-melting fibers. Naturally it can also correspond to the heat-distortion temperature $T_W$. The fiber temperature $T_F$, of the low-melting fibers in the event of the placement or in combination with the reinforcement material may be measured as process temperature or air temperature in the placement or combination of the low-melting fibers in the current method. The heat distortion or the heat-distortion temperature $T_W$ of the thermoplastic plastic of the low-melting fiber is a measure of the temperature stability of this thermoplastic plastic. The heat-distortion temperature can be measured according to DIN EN ISO 75-2:2004, method B (heating rate 50 K/h) on an untempered test piece.

A particularly preferred embodiment of the method according to the invention is characterized in that the fiber temperature $T_F$, of the low-melting fibers in combination with the reinforcement material lies between a temperature $T_F$, of 20° C.-preferably 15° C.-below the heat-distortion temperature $T_W$ to 50° C.-preferably 45° C.-above the heat-distortion temperature $T_W$ of the thermoplastic of the low-melting fibers. As already demonstrated above, however, it is within the scope of the invention that the fiber temperature $T_F$, lies below the melting point of the thermoplastic plastic of the low-melting fibers.

Advantageously in the method according to the invention, after the spinning, the low-melting fibers are continuously delivered to the reinforcement material or the reinforcement fibers. In this case the low-melting fibers preferably retain the fiber temperature $T_F$, from the heating in the spinning operation. Thus it is recommended that a treatment or cooling of the low-melting fibers only takes place to the extent that according to the invention the fiber temperature $T_F$, according to the invention lies in the range specified there. It is within the scope of the invention that the reinforcement material has interstices or that between the reinforcement fibers interstices are formed and that during the combination of the low-melting fibers with the reinforcement material or with the reinforcement fibers the fibers or the fiber sections of the low-melting fibers can penetrate into the interstices. In this respect the invention is based on the recognition that the low-melting fibers combined according to the invention with the reinforcement material with the reinforcement fibers with the fiber temperature $T_F$, are sufficiently flexible or malleable or soft that they can penetrate into the interstices of the reinforcement material or between the reinforcement fibers without problems at least with fiber sections. This results in a sort of entanglement of the reinforcement material or the reinforcement fibers with the low-melting fibers. Furthermore the invention is based on the recognition that the laminate produced in the manner described above is sufficiently stable and consistent in shape or is already sufficiently consolidated, so that it can be delivered directly to the manufacture of the composite molded part or of the composite fiber molded part without special stabilization measures. In this case it is within the scope of the invention that the laminate that can already be used as a semifinished product is delivered to the composite molded part or composite fiber molded part for further processing without stabilization, in particular without thermal stabilization or without calendering and/or without needling and/or without stitching and/or without adhesion and/or without chemical stabilization. In this case "without stabilization" means in particular that the laminate or the semifinished product can in principle be easily compacted or can be easily compacted by compacting rollers, but is not subjected to any special stabilization method, in particular no thermal stabilization or needling or stitching or adhesion. In this respect the invention is based on the recognition that a special stabilization is not necessary if low-melting fibers at the fiber temperature $T_F$, according to the invention are combined with the reinforcement material or with the reinforcement fibers into the laminate or into the semifinished product.

In principle within the scope of the method according to the invention different materials are used for the high-melting reinforcement material, for example high-melting reinforcement fibers in the form of glass fibers or the like. However, the high-melting reinforcement material or the high-melting reinforcement fibers may also be made of a plastic or a thermoplastic plastic. A preferred embodiment of the invention is characterized in that in the method according to the invention the high-melting reinforcement material or the high-melting reinforcement fibers on the one hand and the low-melting fibers on the other hand are made of the same plastic or of the same type of plastic. Thus for example high-melting polypropylene fibers are used as reinforcement fibers and low-melting polypropylene fibers are used as low-melting fibers for making the semifinished product according to the invention. Further below and with regard to the same plastic or the same type of plastic for the high-melting reinforcement material and for the low-melting fibers further embodiments are disclosed that relate or may be related to the method according to the invention. Thus within the scope of the method according to the invention for example according to the invention high-melting polypropylene fibers are used as reinforcement fibers and low-melting polypropylene fibers are used as low-melting fibers for making the semifinished product according to the invention.

Advantageously the low-melting fibers or at least a layer of low-melting fibers is used in the form of a nonwoven fabric or in the form of a random fiber sheet. It is within the scope of the invention that the low-melting fibers are produced or spun as continuous filaments. As is explained in greater detail below, according to a particularly recommended embodiment of the invention the low-melting fibers are spun as melt-blown fibers and particularly preferably as biax melt-blown fibers. The low-melting fibers then preferably have a fiber diameter from 1 to 10 μm. In principle the low-melting fibers are also produced as a spun-laid nonwoven made of continuous filaments by a spunbond method. Also this method is explained in greater detail below. According to another variant the low-melting fibers can also be produced in the context of a hot-melt method with the aid of a hot-melt blow head.

A recommended embodiment of the invention is characterized in that the layer of high-melting reinforcement material—in particular the layer of high-melting reinforcement fibers—is between at least two layers and in particular between two layers of low-melting fibers of thermoplastic plastic to form the laminate. Thus according to a variant of the invention a three-layer laminate is produced. In principle in the laminate produced within the scope of the invention further layers of reinforcement material/reinforcement fibers and/or of low-melting fibers are possible.

The invention also relates to a method of making a semifinished product for the manufacture of a composite molded part, in particular a composite fiber molded part, wherein a high-melting reinforcement material, in particular high-melting reinforcement fibers, is combined with low-melting fibers of thermoplastic plastic into a laminate, wherein the low-melting fibers are spun and after spinning are combined with the high-melting reinforcement material, in particular with the high-melting reinforcement fibers into the laminate forming the semifinished product, and wherein the high-melting reinforcement material or the high-melting reinforcement fibers and the low-melting fibers are made of the same plastic or the same type of plastic. After spinning, the low-melting fibers are combined at a fiber thickness <10 den, preferably <3 den and particularly preferably <1.5 den with the high-melting reinforcement material, in particular with the high-melting reinforcement fibers, into the laminate forming the semifinished product.

According to this embodiment of the invention both the high-melting reinforcement material or the high-melting reinforcement fibers and also the low-melting fibers are made of the same polyolefin or of the same polyester or of the same polyamide. Thus both the high-melting reinforcement fibers and also the low-melting fibers are made of polypropylene or of polyethylene or of polyethylene terephthalate (PET) or of polybutylene terephthalate (PBT). According to a variant the high-melting reinforcement fibers may for example be made of polyethylene terephthalate (PET) and the low-melting fibers may be made of a copolymer of the polyethylene terephthalate (CoPET). In this respect "the same type of plastic" also means at least one plastic or a copolymer of the relevant plastic or the same plastic.

In this embodiment with the same plastics or with the same types of plastic the higher melting point of high-melting reinforcement fibers can be reached in that the high-melting reinforcement fibers have a higher crystallinity than the low-melting fibers. The high-melting reinforcement fibers can be stretched more markedly than the low-melting fibers. However, the lower melting point of the low-melting fibers can also be achieved by additions—for example by the addition of a copolymer with a lower melting point.

Also in the embodiment with the same plastics or with the same types of plastic the melting point of the high-melting reinforcement material or of the high-melting reinforcement fibers is at least 1° C., preferably at least 5° C. higher than the melting point of the low-melting fibers. According to a variant the difference between the melting points is at least 10° C. or at least 20° C.

The embodiment with the same plastic or with the same type of plastic in the high-melting reinforcement material, on the one hand, and in the low-melting fibers, on the other hand, is characterized in an advantageous manner by problem-free recycling. In the recycling of the composite molded parts or composite fiber molded parts produced from the semifinished product according to the invention a costly separation of the individual components is not necessary. This is very advantageous especially for composite molded parts in the automotive industry, since a high recycling rate is required here. Furthermore in this embodiment the spun low-melting fibers can be combined in a simple and especially effective manner with the high-melting reinforcement material or with the high-melting reinforcement fibers, resulting in relatively stable laminates for which very energy-intensive stabilization measures are not necessary in principle. It is within the scope of the invention that also in the embodiment according to FIG. 6 with the same plastics or the same types of plastic the semifinished product is delivered to the composite molded part, in particular to the composite fiber molded part, for further processing without stabilization, in particular without calendering and/or without needling and/or without stitching and/or without adhesion and/or without chemical stabilization.

Nevertheless it is, however, also within the scope of the invention that in this embodiment the laminate consisting of the at least one layer of high-melting reinforcement material—in particular of high-melting reinforcement fibers—and the at least one layer of low-melting fibers is stabilized before the further processing into the composite molded part or the composite fiber molded part. In this case "stabilization of the laminate" means in particular the connection and/or the entanglement of the high-melting and low-melting components. The laminate is preferably stabilized by at least one type of stabilization from the group "mechanical needling, water jet stabilization, calendering, thermobonding with hot air, adhesion, chemical connection." "Adhesion" here means in particular adhesion by hot-melt, in particular from the same group of substances as the reinforcement material and the low-melting fibers. Because of the additional stabilization the laminate is particularly easy to handle and is characterized by good draping properties, so that the laminate can also be used without problems as material on a roll.

The preferred embodiments or variants explained below relate both to the teaching according to the invention as set forth in the invention with the same plastic or with the same type of plastic for the high-melting component and the low-melting component.

An embodiment that is particularly important within the scope of the invention is characterized in that the at least one layer of low-melting fibers of thermoplastic plastic is a nonwoven fabric. It is within the scope of the invention that the nonwoven fabric is a random fiber sheet. In the laminate according to the invention all layers are advantageously made of low-melting fibers of thermoplastic plastic nonwoven fabrics. According to a particularly recommended embodiment of the invention a nonwoven fabric made of low-melting fibers is a spun-laid nonwoven made of continuous filaments.

It is within the scope of the invention that such a spun-laid nonwoven is produced from continuous filaments by a spunbond method. In this case continuous filaments of thermoplastic plastic are spun from a spinneret and are then cooled in a cooling chamber. These cooled continuous filaments are then advantageously introduced into a stretching unit and finally are preferably set down on a conveyor belt or screen belt. It is recommended that the continuous filaments of the spun-laid nonwoven have a fiber diameter of 10 to 35 µm, and preferably the fiber diameter of the continuous filaments is greater than 10 µm or significantly greater than 10 µm. The melt flow index (MFI) of the polypropylene used for the manufacture of a spun-laid nonwoven is advantageously 10 to 100 g/10 min. Within the scope of the invention the melt flow index (MFI) is measured according to EN ISO 1133 at a test temperature of 230° C. and at a nominal mass of 2.16 kg. According to a preferred embodiment of the invention a layer made of high-melting reinforcement material—in particular of high-melting reinforcement fibers—is between two spun-laid nonwovens made of continuous filaments of thermoplastic plastic.

A particularly preferred embodiment in the context of the method according to the invention is characterized in that a melt-blown nonwoven is used as nonwoven fabric and preferably a biax melt-blown nonwoven is used. Melt-blown nonwovens and especially biax melt-blown nonwovens have proved particularly successful within the scope of the invention. Melt-blown nonwovens are produced in melt-blown machines that have a nozzle head or melt-blown blow head that is equipped with a plurality of nozzle orifices arrayed in at least one row. From these nozzle orifices the plastic melt or the molten plastic filaments is/are extruded into a very fast blow air stream. As a result the melt is transformed into fine fibers, solidified, and the fibers are then set down on a support, in particular on a screen belt—to form a fine-fiber melt-blown nonwoven. In the conventional melt-blown method an extensive blow air stream or extensive blow air streams is/are applied to the curtain of extruded plastic filaments from the side or from opposite sides. In contrast to this, in the biax melt-blown method a separate blow air stream or a blow air stream surrounding the filament like a sheath is applied to each individual nozzle orifice or each individual extruded plastic filament. Biax melt-blown nonwovens produced by the biax melt-blown method have proved particularly successful within the scope of the invention. The melt-blown nonwovens or biax melt-blown nonwovens used in the method according to the invention have fibers with a fiber diameter of advantageously 1 to 10 μm. A polypropylene with a melt flow index (MFI) of 75 to 2,500 g/10 min is used for example for making the melt-blown nonwovens or biax melt-blown nonwovens. A melt flow index of 100 to 150 g/10 min has provided quite particularly successful. According to a particularly recommended embodiment of the method according to the invention a layer made of high-melting reinforcement material or of high-melting reinforcement fibers is used that is between or directly between two melt-blown nonwovens and preferably between two biax melt-blown nonwovens. In principle in this embodiment, with the same plastics or the same types of plastic, the low-melting fibers can also be produced in the context of a hot-melt method with the aid of a hot-melt blow head.

According to an embodiment of the method according to the invention that has proved successful, low-melting fibers of at least one polyolefin, preferably of polypropylene and/or polyethylene, are used. However, in principle the low-melting fibers can also be made of other thermoplastics, in particular also of a polyester, for example of polyethylene terephthalate (PET) or of polyamide (PA).

It is recommended that for a layer made of high-melting reinforcement fibers at least one fiber type from the group "glass fibers, aramid fibers, carbon fibers, metal fibers, fibers of thermoplastic plastic" is used. In principle the high-melting reinforcement fibers may also be natural fibers. The fibers can be used as short fibers and/or long fibers. It is within the context of the invention that the layer of high-melting reinforcement fibers is a laid fabric and/or a woven fabric and/or a braided fabric and/or a knitted fabric. Laid fabrics and woven fabrics have proved particularly successful. Thus for example a laid fabric of glass fibers can be used as a layer of high-melting reinforcement fibers. According to another preferred embodiment of the invention the layer of high-melting reinforcement fibers is a nonwoven fabric of high-melting reinforcement fibers, preferably of high-melting plastic fibers. Thus for example a nonwoven fabric of PET fibers can be used as a layer of high-melting reinforcement fibers, wherein this nonwoven fabric is for example between two melt-blown nonwovens made of polypropylene fibers. Moreover it has proved successful for the reinforcement fibers to be admixed with an impregnating agent or with an adhesion promoter in order to achieve a better contact or adhesion with the molten thermoplastic plastic.

According to a variant the at least one layer of reinforcement fibers as material on a roll is combined with the at least one layer of low-melting fibers or the reinforcement fibers are for example combined in an air-laid method with the at least one layer of low-melting fibers. The at least two layers can also be applied to one another continuously as material on a roll or discontinuously as two-dimensional sheet materials. It is within the scope of the invention that the laminate produced according to the invention can be rolled up into a roll and thus can be further used as material on a roll. This is made possible by the flexible characteristics and by the good draping properties of the laminate produced according to the invention.

The manufacture of a composite molded part, in particular a composite fiber molded part, according to the invention is described below. In the composite molded part or composite fiber molded part, high-melting reinforcement material or high-melting reinforcement fibers is embedded in a matrix of thermoplastic plastic. For making the composite molded part or of the composite fiber molded part heat and/or pressure is applied to the laminate or the semifinished product produced according to the invention, so that the low-melting fibers of thermoplastic plastic melt and the non-molten reinforcement material or the non-molten reinforcement fibers are impregnated with the thermoplastic melt or are embedded in the matrix of thermoplastic plastic. The application of heat and/or pressure to the laminate or to the semifinished product can take place "inline" or "offline." It is within the scope of the invention that when heat and/or pressure are applied the heating temperature is selected or adjusted so that only the low-melting fibers melt or that substantially only the low-melting fibers melt. It will be understood that, after the application of heat and/or pressure or after the molding of the composite molded part/composite fiber molded part, a cooling of the matrix of thermoplastic plastic with the embedded reinforcement material or with the embedded reinforcement fibers takes place. With the method according to the invention a composite molded part or composite fiber molded part is preferably produced as a lightweight construction.

For the application of warmth or heat and/or pressure the laminate or the semifinished product produced according to the invention is advantageously introduced into a pressing tool and is preferably deformed there under the effect of heat and the effect of pressure. The impregnation of the reinforcement material or the reinforcement fibers with the thermoplastic melt and the embedding of the reinforcement material or of the reinforcement fibers in the matrix of thermoplastic plastic should take place within the scope of the invention as completely as possible and with minimization of air inclusions.

A quite particularly preferred embodiment of the method according to the invention is characterized in that the laminate/semifinished product produced according to the invention is transformed into a composite molded part or composite fiber molded part by application of heat and/or pressure directly in the course of a thermoforming process and/or an injection-molding process. Thus, in contrast to the method known in the art as described in the introduction, the laminate/semifinished product is then processed to form the end product directly and without an intermediate melting and hardening process. Thus there is no need for the manufacture of an additional semifinished product from the reinforcement material or from the reinforcement fibers and a thermoplastic matrix and therefore by comparison with the known method a processing step can be omitted. "Thermoforming process" means in particular a deep-drawing process. In the preferred embodiment described above the laminate/semifinished product produced according to the invention can therefore be directly deep-drawn. Because of the ease of handling and good draping properties of the laminate/semifinished product, three-dimensional or multi-dimensional molded parts can be produced according to the invention without problems.

According to another embodiment of the method according to the invention heat and/or pressure is applied to the laminate/semifinished product in a first step and a further or second semifinished product is formed with a matrix of thermoplastic plastic and reinforcement material embedded therein or reinforcement fibers embedded therein. This further or second semifinished product of thermoplastic matrix and embedded reinforcement material or embedded reinforcement fibers is then transformed, only later or in a second step, into a composite molded part or a composite fiber molded part by application of heat and/or pressure in the course of a thermoforming process and/or an injection-molding process. Thus here, as in the method known in the art, first of all in an additional step a further semifinished product is produced that is then processed later to form the end product, for example by deep-drawing to form a three-dimensional or multi-dimensional molded part. Advantageously the further or second semifinished product is produced from the thermoplastic matrix and the embedded reinforcement material in the shape of plates.

The invention also relates to a method of making a composite molded part, in particular a composite fiber molded part, with reinforcement material or reinforcement fibers embedded in a matrix of thermoplastic plastic, wherein at least one layer of high-melting reinforcement material—in particular of high-melting reinforcement fibers—is combined with at least one layer of low-melting fibers of thermoplastic plastic into a laminate. The laminate forms the semifinished product from which the composite molded part or composite fiber molded part can be produced. A distinction is made between the first semifinished product (laminate) described here and the optional further or second semifinished product (semifinished product made of thermoplastic matrix with embedded reinforcement material) described above. The invention is based on the recognition that the semifinished product in the form of the laminate is relatively simple to handle and especially because of its good draping properties it can be wound onto rolls and can be used as material on a roll. In particular a laminate with at least one melt-blown nonwoven as low-melting component can often be handled without problems without additional stabilization because of good adhesion and can be further processed to form the composite molded part/composite fiber molded part directly or for example can be wound onto a roll.

The invention also relates to a composite molded part, in particular a composite fiber molded part that can be produced by the method according to the invention as described above and/or from the semifinished product according to the invention as described above, wherein a high-melting reinforcement material—in particular high-melting reinforcement fibers—is/are embedded in a matrix of low-melting thermoplastic plastic and wherein the matrix has been produced from low-melting fibers of the thermoplastic plastic.

The invention is based first of all on the recognition that the semifinished products produced by the method according to the invention are characterized by a particularly effective or firm connection of the layers forming them. These semifinished products constitute surprisingly dimensionally stable assemblies that can be further processed or further handled without further stabilization or at least without energy-intensive stabilization measures. The laminates or semifinished products produced according to the invention are characterized by excellent handling and in particular draping properties. The semifinished products can advantageously be processed directly to form the composite molded part or the composite fiber molded part or can be wound directly on rollers. In this respect the invention is characterized by low complexity and low costs. The semifinished products can be used without problems as flexible material on a roll and three-dimensional or multi-dimensional molded parts can be produced in a simple manner. Furthermore the invention is based on the recognition that when the measures according to the invention are implemented an optimal impregnation or wetting of the reinforcement fiber with the melt of thermoplastic plastic is possible. Air inclusions in the thermoplastic matrix can be avoided or at least largely avoided. In the method according to the invention the impregnation or wetting and the formation of the molded parts can take place in a simple manner in a single pressing tool. The composite molded parts or composite fiber molded parts produced according to the invention are also characterized by outstanding mechanical characteristics. Furthermore it may be pointed out that in particular with appropriate choice of material the composite molded parts or composite fiber molded parts produced according to the invention can be recycled in a simple and inexpensive manner. In this respect the invention is characterized by low complexity and low costs.

BRIEF DESCRIPTION OF THE DRAWING

The invention is described in greater detail below with reference to drawings that show only one embodiment. In the drawings, in schematic representation:

FIG. 4 is a perspective view of a composite fiber molded part produced according to the invention.

SPECIFIC DESCRIPTION OF THE INVENTION

Figure 1:
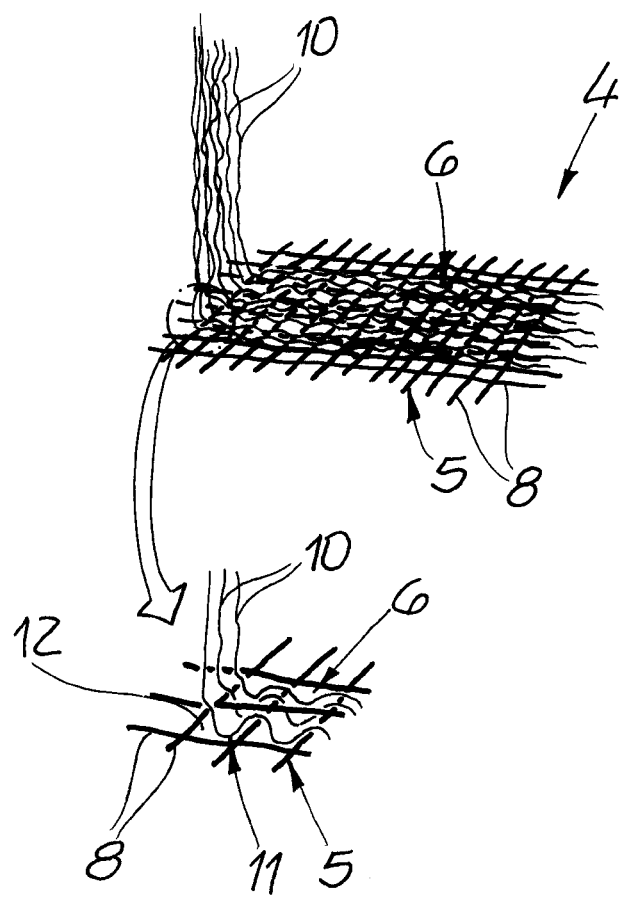
FIG. 1 shows schematically the manufacture of a laminate forming a semifinished product according to the invention.

FIG. 1 schematically shows the manufacture of a laminate 4 forming a semifinished product according to the invention. The laminate 4 here consists of a layer of high-melting reinforcement fibers in the form of a glass-fiber fabric 5 made of glass fibers 8. Low-melting fibers 10 are preferably produced in this embodiment by a biax melt-blown method. These fibers may be low-melting polypropylene fibers that are combined with the glass fibers 8 or with the glass-fiber fabric 5. Advantageously in this embodiment a biax melt-blown nonwoven 6 is laid on the glass-fiber fabric 5. According to the invention the low-melting fibers 10 or the polypropylene fibers have a fiber temperature $T_F$ in the region of the heat-distortion temperature $T_W$ of the polypropylene. It can be seen from FIG. 1 that because of their fiber temperature $T_F$ the low-melting fibers 10 combined with the glass fibers 8 or with the glass-fiber fabric 5 are so soft or flexible and malleable that they penetrate with fiber sections 11 into interstices 12 formed between the glass fibers 8 of the glass-fiber fabric 5. In this way an effective entanglement or connection between the high-melting glass fibers 8 and the low-melting fibers 10 is produced. The laminate 4 that is formed can in principle be supplied without special stabilization for further processing to form the composite molded part or the composite fiber molded part 7.

Figure 2:
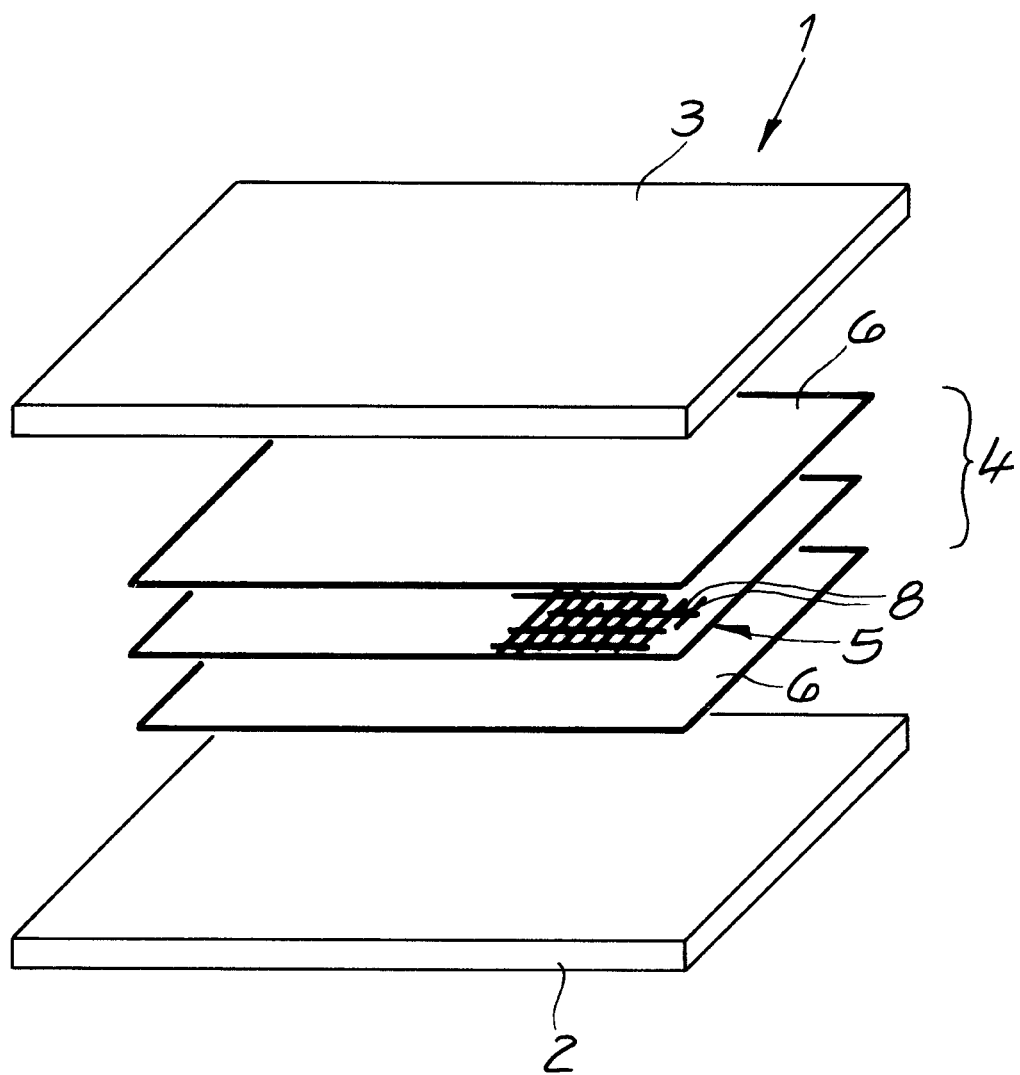
FIG. 2 shows a device for carrying out the method according to the invention.

FIG. 2 shows very schematically a pressing tool 1 with two platens 2 and 3. In the embodiment a three-layer laminate 4 is between the platens 2 and 3. This laminate 4 has a central layer of high-melting reinforcement fibers in the form of a glass-fiber fabric 5. This glass-fiber fabric 5 is between two biax melt-blown nonwovens 6 made of polypropylene fibers. When the platens 2 and 3 are pressed together, heat and pressure applied to the laminate melt the low-melting polypropylene fibers. The heating temperature is selected so that only the polypropylene fibers melt and the glass fibers 8 of the glass-fiber fabric 5 on the other hand are not melted. On the contrary, the glass fibers 8 are impregnated or wetted by the thermoplastic polypropylene melt and in this way the glass fibers 8 are embedded in a matrix of thermoplastic plastic (PP). According to a preferred embodiment of the invention a composite fiber molded part 7 can be produced directly in the manner described above. A simple pressing tool 1 is shown only very schematically in FIG. 2. In principle within the scope of the invention three-dimensional or multi-dimensional molded parts with complicated structures can be produced in a simple manner with special pressing tools. The flexible handling and good draping properties of the laminate 4 contribute to this.

Figure 3:
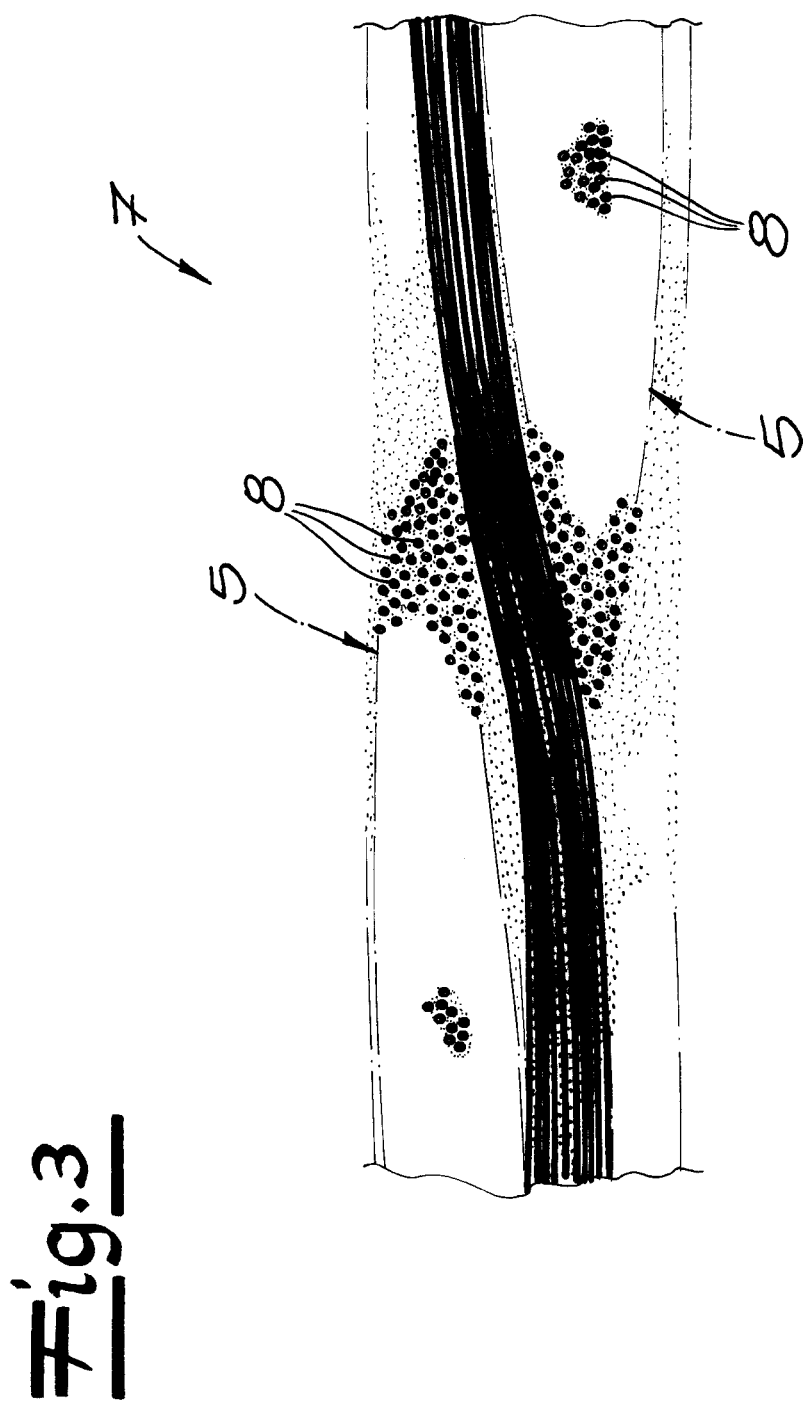
FIG. 3 is a section through a composite fiber molded part produced according to the invention.

FIG. 3 shows a section through a composite fiber molded part 7 produced by the method according to the invention after cooling. It can be seen that the glass fibers 8 of the glass-fiber fabric 5 are completely embedded in the thermoplastic polypropylene matrix. Disruptive air inclusions are not observed and they can be avoided in a simple manner when the measures according to the invention are implemented. The composite fiber molded parts 7 produced in this way according to the invention have optimal mechanical characteristics. In FIG. 4 moreover a further composite fiber molded part 7 with multi-dimensional structure produced according to the invention is illustrated. Within the scope of the method according to the invention multi-dimensional structures can be implemented simply and without problems.

The invention claimed is:

1. A method of making a semifinished product for the manufacture of a composite fiber molded part, the method comprising the steps of:
    spinning from a row of orifices of a spinning nozzle low-melting fibers of polypropylene having a predetermined heat-distortion temperature, a predetermined melting temperature, and a melt-flow index of 75 to 2500 g/10 min;
    projecting respective air streams from the orifices around the fibers;
    forming the low-melting fibers into a nonwoven;
    combining high-melting reinforcement fibers having a melting temperature at least 5° C. higher than the melting temperature of the low-melting fibers with the nonwoven formed from the low-melting fibers into a laminated semifinished product while maintaining the low-melting fibers at a fiber temperature that lies in a temperature range between 25° C. below the predetermined heat-distortion temperature and 55° C. above the predetermined heat-distortion temperature of the thermoplastic material of the low-melting fibers; and
    applying heat or pressure to the semifinished product such that the low-melting fibers melt and form a thermoplastic material that impregnates the reinforcement fibers and forms a matrix in which the reinforcement fibers are embedded.

2. The method according to claim 1, further comprising the steps after the spinning and before the combining of:
    continuously delivering the low-melting fibers at the fiber temperature to the reinforcement fibers; and
    heating the low-melting fibers to the fiber temperature during spinning.

3. The method according to claim 1, wherein the fiber temperature of the low-melting fibers in the laminate with the reinforcement fibers lies between a temperature of 20° C. below the heat-distortion temperature to 50° C. above the heat-distortion temperature of the thermoplastic of the low-melting fibers.

4. The method according to claim 1, wherein the reinforcement fibers form interstices that are penetrated by the thermoplastic material during the combination of the nonwoven formed from the low-melting fibers with the reinforcement fibers.

5. The method according to claim 1, further comprising the step of:
    using the semifinished product as the composite fiber molded part without calendering, needling, stitching or adhesion or chemical stabilization.

6. The method according to claim 1, wherein the low-melting fibers have a fiber thickness<10 den.

7. The method according to claim 1, wherein the low-melting fibers are formed from continuous filaments each emitted by a respective one of the nozzles and separated into fine fibers by the respective air streams as the filaments issue from the respective nozzles.

8. The method according to claim 1, wherein the high-melting reinforcement fibers are glass fibers, aramid fibers, carbon fibers, metal fibers, or fibers of thermoplastic plastic.

9. The method according to claim 1, further comprising the step of:
    inserting a layer of the high-melting reinforcement fibers between two layers of the nonwoven formed from the low-melting fibers during the combination to form the laminate.

10. The method according to claim 1, further comprising the step of:
    transforming the semifinished product into the composite fiber molded part by application of heat or pressure in the course of a thermoforming process or an injection-molding process.

11. A method of making a semifinished product for the manufacture of a composite molded fiber molded part, the method comprising the steps of:
    spinning from a row of orifices of a spinning nozzle low-melting fibers of polypropylene having a predetermined low melting temperature and a melt-flow index of 75 to 2500 g/10 min;
    projecting respective air streams from the orifices around the fibers;
    forming from the low-melting spun fibers a nonwoven;
    combining high-melting reinforcement fibers of the same type of plastic as the low-melting fibers and having a melting temperature at least 5° C. higher than the melting temperature of the low-melting fibers with the nonwoven formed from low-melting fibers of thermoplastic material into a laminated semifinished product; and applying heat or pressure to the semifinished product such that the low-melting fibers melt and form a thermoplastic material that impregnates the reinforcement fibers and forms a matrix in which the reinforcement fibers are embedded.

12. The method according to claim 11, further comprising the step of:

stabilizing the laminate by mechanical needling, water jet stabilization, calendering, thermobonding with hot air, adhesion, or chemical connection.

13. The method according to claim 11, further comprising the step of:

further processing the semifinished product to form the composite molded part or composite fiber molded part.

14. A method of making a semifinished product for the manufacture of a composite fiber molded part, the method comprising the steps of:

spinning from each orifice of a row of orifices of a spinning nozzle a respective low-melting filament of polypropylene having a predetermined heat-distortion temperature, a predetermined melting temperature, and a melt-flow index of 75 to 2500 g/10 min;

projecting respective air streams from each of the orifices around the respective filaments to form them into low-melting fibers;

forming the low-melting fibers into a nonwoven;

combining high-melting reinforcement fibers having a melting temperature at least 5° C. higher than the melting temperature of the low-melting fibers with the nonwoven formed from the low-melting fibers into a laminated semifinished product while maintaining the low-melting fibers at a fiber temperature that lies in a temperature range between 25° C. below the predetermined heat-distortion temperature and 55° C. above the predetermined heat-distortion temperature of the thermoplastic material of the low-melting fibers; and applying heat or pressure to the semifinished product such that the low-melting fibers melt and form a thermoplastic material that impregnates the reinforcement fibers and forms a matrix in which the reinforcement fibers are embedded.

\* \* \* \* \*